July 15, 1958 M. R. MANTZ ET AL 2,843,740

HIGH-FREQUENCY MULTI-CHANNEL GENERATOR

Filed May 3, 1955 4 Sheets-Sheet 2

INVENTORS
MARIUS ROBERT MANTZ
JAAP STARREVELD
HENRI JACQUES SUERMONDT
BY Fred M. Vogel
AGENT July 15, 1958 M. R. MANTZ ET AL 2,843,740

HIGH-FREQUENCY MULTI-CHANNEL GENERATOR

Filed May 3, 1955 4 Sheets-Sheet 3

INVENTORS
MARIUS ROBERT MANTZ
JAAP STARREVELD
HENRI JACQUES SUERMONDT
BY Fred M. Vogel
AGENT INVENTORS
MARIUS ROBERT MANTZ
JAAP STARREVELD
HENRI JACQUES SUERMONDT
BY Fred M. Vogel
AGENT United States Patent Office 2,843,740

Patented July 15, 1958

2,843,740

HIGH-FREQUENCY MULTI-CHANNEL GENERATOR

Marius Robert Mantz, Jaap Starrveld, and Henri Jacques Suermondt, Hilversum, Netherlands, assignors, by mesne assignments, to North American Philips Company, Inc., New York, N. Y., a corporation of Delaware Application May 3, 1955, Serial No. 505,774

10 Claims. (Cl. 250—36)

Figures 1, 2:
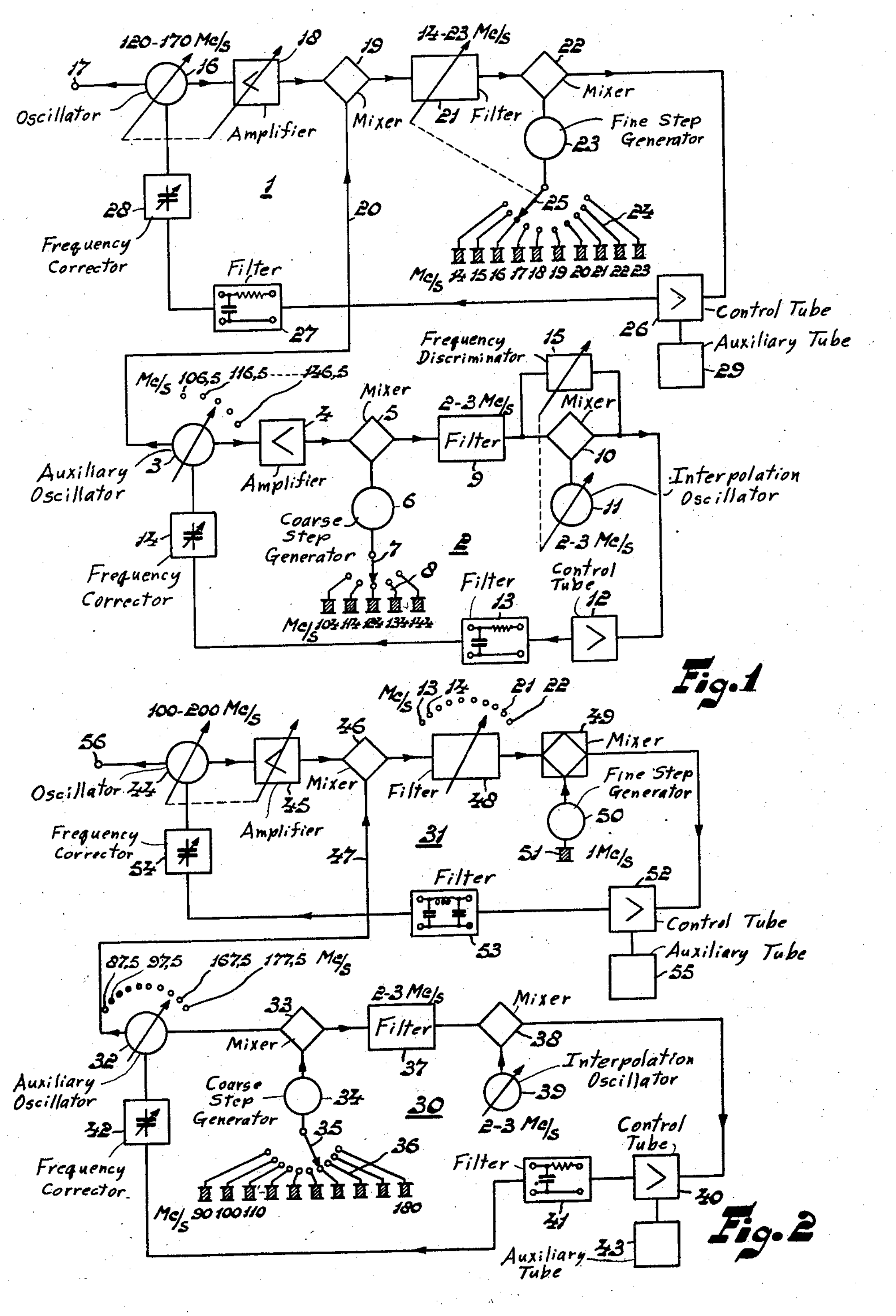

The invention relates to multi-channel generators for generating oscillations of high and stable final frequency (the stability may, for example, exceed $10^{-6}/°$ C.) which are adjustable in coarse, fine and interpolation steps of, for example, 10, 1 and 0.1 mc./s. respectively, the final frequency being derived from a final frequency oscillator which by means of automatic frequency control (AFC) is stabilized with respect to a crystal controlled coarse-step generator, a crystal controlled fine-step generator and an interpolation oscillator. Such multi-channel generators are of particular importance for use in V. H. F. and U. H. F. multi-channel communication apparatus.

In a known arrangement of this kind, in which use is made of three decade generators, each comprising ten crystals (cf. Proc. I. E. E., part III, March 1954, pages 85 to 90), the control voltage required for automatic frequency control of the final frequency oscillator is obtained by changing down the final frequency in three successive mixer stages with intervening filters by mixing in succession with the frequencies of the coarse-step generator, the fine-step generator and the interpolation steps oscillator.

Although in such a so-called frequency analysis arrangement interfering additional frequencies in the signal of the final frequency oscillator are materially reduced due to the provision of the usual low-pass filter for smoothing the control voltage, a comparatively large number of channels exhibit interference whistles. It is found that other additional frequencies also are insufficiently rejected with the result that a considerable number of the theoretically available channel frequencies cannot be used in practice.

It is an object of the invention to provide a multi-channel generator of the kind described in the opening part, of special design by which primarily the said difficulties are reduced or even avoided with the use of only simple filters and a simple and clear set-up.

It is a further object of the invention to provide a considerable saving in crystals and to enable the interpolation oscillator to be made continuously variable without meeting with difficulty due to additional frequencies which interfere in practice.

According to the invention the multi-channel generator described in the opening part for this purpose comprises an auxiliary oscillator which for automatic frequency control with respect to the coarse-step generator and the interpolation oscillator forms part of an auxiliary AFC loop comprising a first mixer stage coupled to the auxiliary oscillator and the coarse-step generator to obtain an interpolation frequency and a second mixer stage coupled to the interpolation oscillator and through an interpolation frequency filter to the output of the first mixer stage, a control voltage being taken from the said second mixer stage, which voltage via a low-pass smoothing filter controls a frequency corrector coupled to the auxiliary oscillator, the final frequency signals being taken from a main oscillator which for automatic frequency control with respect to the auxiliary oscillator and the crystal controlled fine-step generator forms part of a main AFC loop comprising a first mixer stage coupled to the main and auxiliary oscillators to obtain an intermediate frequency and a second mixer stage which is coupled to the crystal controlled fine-step generator and via an intermediate frequency filter to the output of the first mixer stage, a control voltage being derived from the said second mixer stage, which voltage via a low-pass smoothing filter controls a frequency corrector which is coupled to the main oscillator.

Figure 3A:
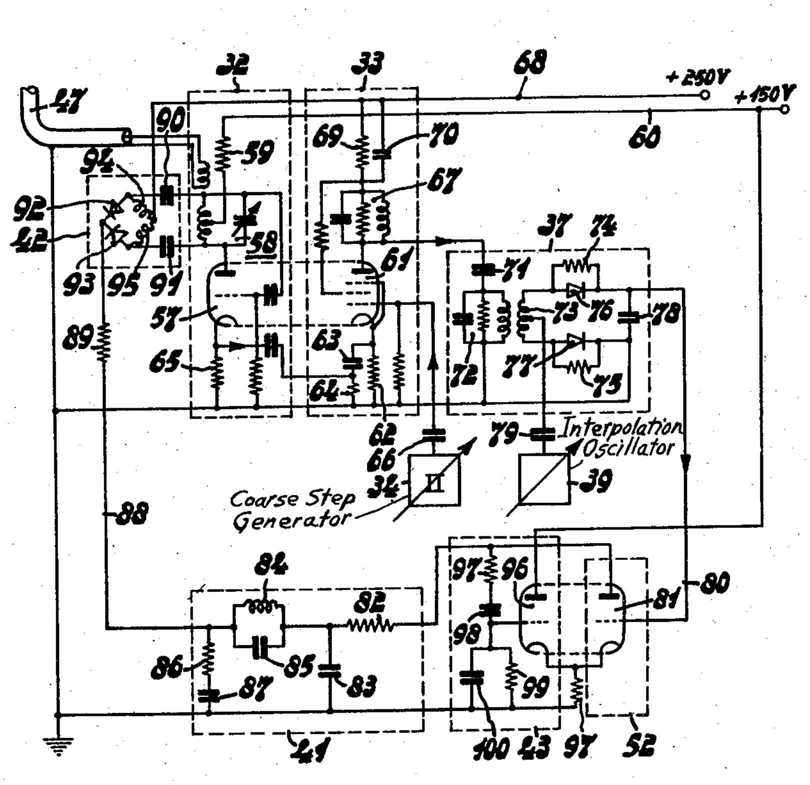
Figure 3B:
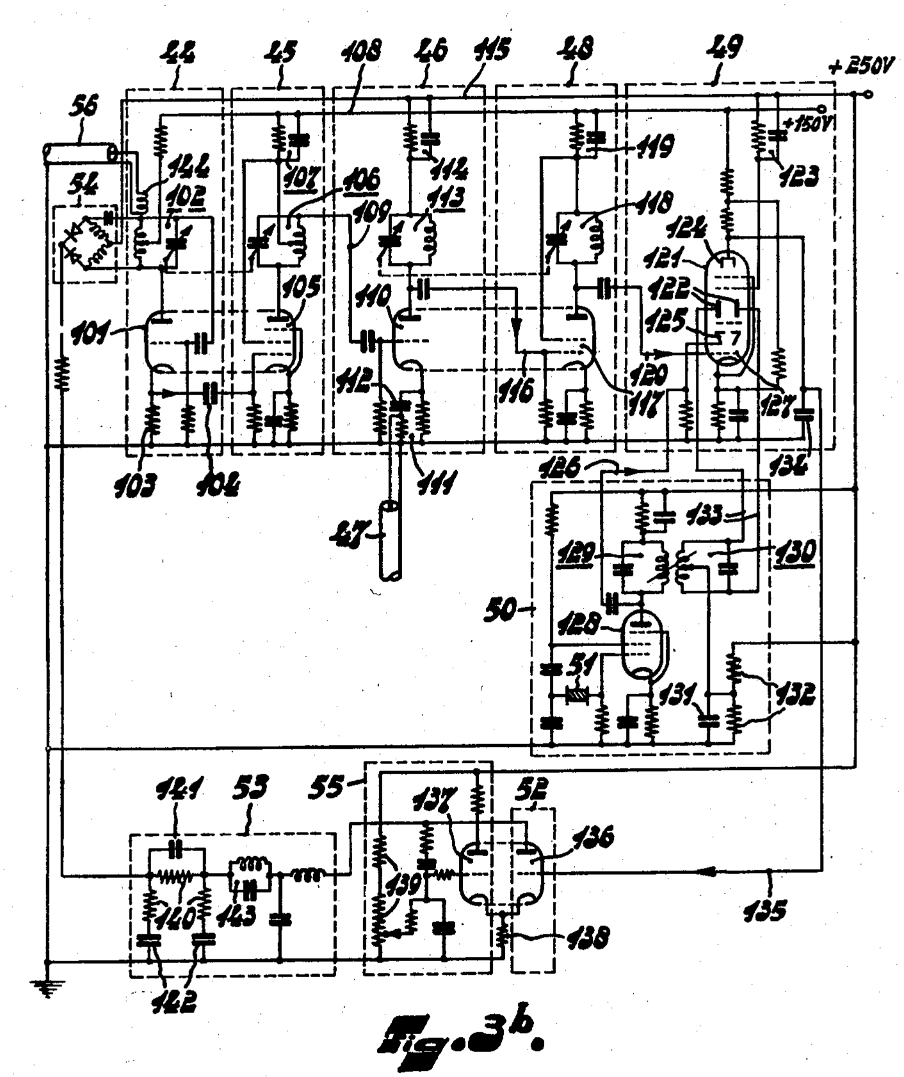
Figure 4:
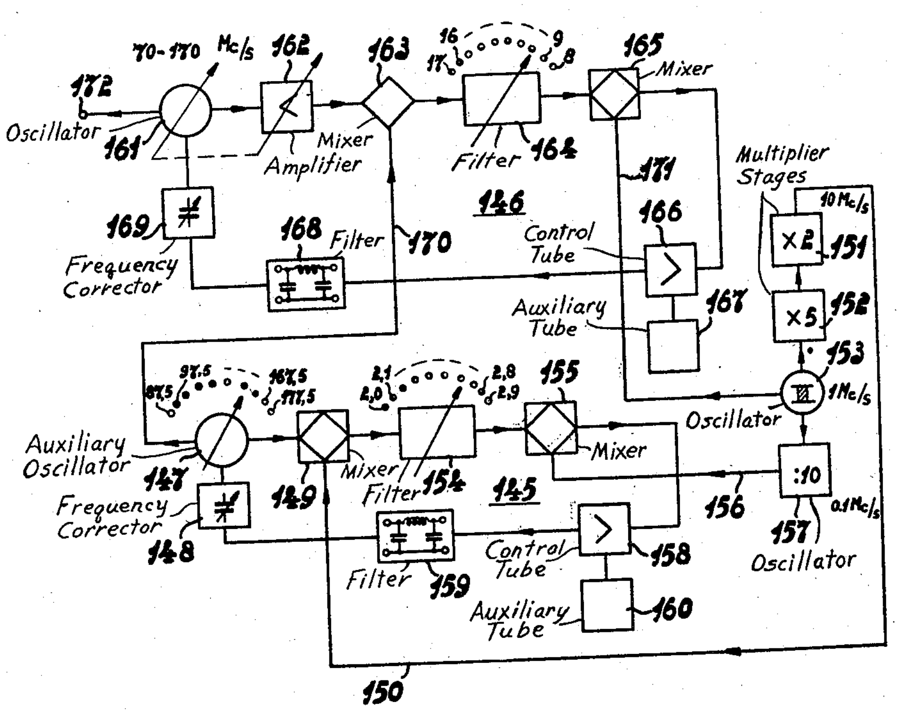

The invention will now be described more fully with reference to the accompanying diagrammatic drawing, in which:

Fig. 1 is a block diagram of a multi-channel generator in accordance with the invention for a range of from 120 to 170 mc./s. comprising 5 coarse-step crystals, 10 fine-step crystals and a continuously adjustable interpolation oscillator, Fig. 2 is a block diagram of a preferred embodiment of such an apparatus for a range of from 100 to 200 mc./s. comprising 10 coarse-step crystals, 1 fine step crystal and a continuously adjustable interpolation oscillator, Figs. 3*a* and 3*b* are diagrams shown in greater detail of the auxiliary and main AFC loops respectively for use in the multi-channel generator shown in Fig. 2, and Fig. 4 is a block diagram of a further embodiment of a multi-channel generator in accordance with the invention, in which the coarse-step frequencies, the fine-step frequencies and predetermined interpolation frequencies are derived from a single crystal.

The multi-channel generator shown in Fig. 1 comprises a main AFC loop 1 and an auxiliary AFC loop 2. The auxiliary AFC loop 2 will now be described more fully.

The auxiliary AFC loop 2 comprises an auxiliary oscillator 3 which by means of a step mechanism, for example a switch can be tuned to five frequencies with relative spacings of 10 mc./s. The accurate selection of the said tuning frequencies will be described more fully hereinafter.

In the auxiliary AFC loop the output signal of the auxiliary oscillator 3 is supplied through a separating amplifier 4 to a mixer stage 5 for changing down the auxiliary oscillator frequency to the interpolation frequency which in the case concerned is between 2 and 3 mc./s. For this purpose an input of the mixer stage 5 is coupled to the output of a coarse-step oscillator 6 which produces frequencies separated by mutual intervals of 10 mc./s., which frequencies can be selected by means of a coarse-step switch 7 which permits of selecting any of the five available coarse-step crystals 8. For the sake of simplicity the available frequencies for the coarse-step generator are indicated in the drawing adjacent the crystals as 104, 114, . . . 144 mc./s., although in practice use will be made of crystals for lower frequencies, for example, overtone crystals for preferably 30 to 50 mc./s., the desired coarse-step generator frequency being obtained by frequency multiplication.

The output signal of the mixer stage 5 is supplied through an interpolation frequency filter 9 comprising a pass band of from 2 to 3 mc./s. to a second mixer stage 10 to which an interpolation oscillator 11 is connected. The interpolation oscillator 11 is continuously adjustable from 2 to 3 mc./s. This oscillator must be sufficiently stable compared with the stability of, for example, the crystal controlled coarse-step generator in order to prevent variation of the output frequency of the auxiliary oscillator 3 from being largely determined by the instability of the interpolation oscillator. Due to the considerable difference between the frequency of the coarse step generator and that of the interpolation oscillator the said stability requirement which the interpolation oscillator is required to satisfy is acceptable in practice.

If the frequency supplied to the mixer stage 10 via the interpolation frequency filter 9 and the frequency of the interpolation oscillator 11 are equal, a beat direct voltage is produced in the output of the mixer stage 10, as is known per se, which voltage can be used as a control voltage for automatic frequency control of the auxiliary oscillator 3. In the auxiliary AFC loop shown the direct voltage taken from the output of the mixer stage 10 is supplied through a control tube 12 and a following low-pass smoothing filter 13 to a frequency corrector 14 which is coupled to the frequency-determining resonant circuit of the auxiliary oscillator 3 and is controlled by the control tube current.

In order to reject interfering additional frequencies in the output signal of the auxiliary oscillator 3 in the described AFC loop system comprising the elements 3, 4, 5, 9, 10, 12, 13 and 14 it is desirable for the cut-off frequency of the smoothing filter 13 to be comparatively low, for example about 10 to 25 kc./s. However, with such a cut-off frequency of the filter 13 in the control lead the required automatic stabilization or "catching" of the frequency of the auxiliary oscillator 3 is produced only if this oscillator is initially adjusted so that the produced interpolation frequency does not differ from the adjusted interpolation frequency of the interpolation oscillator 11 by more than approximately 5 kc./s. An adjusting accuracy of the auxiliary oscillator 3 of $\pm 5$ kc./s. is difficult to obtain in practice, more particularly with considerable variations of the ambient temperature, for example, from $-30°$ C. to $+60°$ C.

In order to reduce the requirements concerning adjustment accuracy which the auxiliary oscillator 3 is required to satisfy, when a smoothing filter 13 having a comparatively low cut-off frequency is used, the mixer stage 10 can, as is shown in Fig. 1, be bridged by a fre-frequency discriminator 15 which is adapted to be tuned and the tuning means of which are coupled mechanically to the tuning means of the interpolation oscillator 11, as is indicated by broken lines. If, now, the initial tuning of the auxiliary oscillator 3 produces an interpolation frequency across the output of the interpolation frequency filter 9, which frequency differs by too much from the interpolation frequency adjusted by means of the interpolation oscillator 11 for automatic catching to be produced, the frequency discriminator 15 supplies a control direct voltage which forces the frequency of the auxiliary oscillator 3 towards correct tuning until due to automatic catching owing to the output voltage of the mixer stage 10 the frequency of the auxiliary oscillator becomes exactly equal to the sum of the frequencies of the coarse-step generator 6 and of the interpolation oscillator 11.

If required, the tuning means of the interpolation oscillator 11 and the tuning means of the frequency discriminator 15 coupled thereto may be adjustable not only continuously but also to fixed interpolation frequencies spaced by interval of, for example, 100 kc./s. or 50 kc./s by means of a click-stop mechanism.

In the auxiliary AFC loop the auxiliary oscillator can be stabilized by means of the coarse-step generator 6 and the interpolation oscillator 11 on any frequency of five frequency bands of 1 mc./s., which bands are spaced by intervals of 10 mc./s. These frequencies bands are 106–107 mc./s., 116–117 mc./s., 126–127 mc./s., 136–137 mc./s. and 146–147 mc./s. In order to reduce the frequency control of the auxiliary oscillator 3 to be produced by the frequency corrector 14 to a minimum the auxiliary oscillator is adjustable in the manner indicated in the figure by means of a click-stop mechanism, a switch or a tuning motor (not shown) to the center frequencies of the said 1 mc./s. bands, i. e. 106.5 mc./s., 116.5 mc./s. . . . 146.5 mc./s.

If the filters used are of simple design, in the auxiliary AFC loop due to the use at the inputs and output of the mixer stage 5 of frequencies which differ by at least one order of magnitude and due to the low center frequency and the comparatively small band-width of the interpolation frequency filter 9 (only approximately 10% of a frequency coarse step) substantially no disturbing interference whistles occur, even if the signal derived from the overtone crystal oscillator 6 comprises a frequency which is equal to, for example, ⅓ of the desired frequency of 104, 114 . . . or 144 mc./s., i.e. for example, 34⅔, 38 . . . or 48 mc./s. and the desired harmonic thereof is partly produced in the mixer stage. It is essential that the frequencies supplied to the mixer stage 5 should be such that no interference whistles are produced, since in an AFC loop of the kind described comprising a second mixer stage (10) acting as a phase detector, these whistles cannot be rejected by means of the filters 9 and 13. Thus, they produce undesired modulation of the auxiliary oscillator signal via the frequency corrector 14. Undue frequencies produced in the successive mixing processes, which frequencies exceed the cut-off frequency of the smoothing filter 13 or lie outside the pass-range of the interpolation filter 9, are attenuated. However, such undesirable frequencies should likewise be avoided as far as possible in AFC loops of the kind described, in order to permit the use of simple and consequently cheap filtering means.

In AFC loops of the kind described a further difficulty arises in that so-called spurious synchronizations occur, i. e. stabilization of the auxiliary oscillator 3 on a frequency different from that aimed at.

If, for example, the coarse step generator is adjusted to 104 mc./s. and the interpolation oscillator to 3 mc./s. in order to stabilize the auxiliary oscillator 3 to 107 mc./s., such a spurious synchronization may be produced as follows. It is assumed, that the auxiliary oscillator 3 supplies a frequency of 105.5 mc./s. due to insufficiently accurate adjustment. Consequently a frequency of 1.5 mc./s. is produced at the output of the mixer stage 5, which frequency if it is insufficiently attenuated in the interpolation frequency filter 9 produces the double frequency, i. e. 3 mc./s., in the mixer stage 10. This 3 mc./s. voltage together with the 3.9 mc./s. voltage from the interpolation oscillator 11 produces a control voltage which stabilizes the auxiliary oscillator 3 on 101.5 mc./s.

In the described auxiliary AFC loop this spurious synchronization is not likely to occur. Firstly even if the interpolation frequency filter 9 is of simple design the said frequency of 1.5 mc./s. will be sufficiently rejected (for example $-10$ db) to prevent the production of an effective control voltage. Secondly with a suitable design of the frequency discriminator 15 the latter will, if it has a frequency of 1.5 mc./s. supplied to it, provide a control direct voltage which prevents the auxiliary oscillator 3 from being stabilized on the undesired frequency of 105.5 mc./s. Thirdly the said spurious synchronization can be prevented by initially adjusting the auxiliary oscillator 3 to 106.5 mc./s. with a degree of accuracy of, for example, 0.3 mc./s., which does not give rise to difficulty in practice.

Experiments have shown that with a simple design of the interpolation frequency filter 9 the damping produced by said filter for a frequency of 1.5 mc./s. is sufficient per se to prevent the occurrence of the said spurious synchronization.

Spurious synchronizations may alternatively occur due to higher harmonics of the interpolation oscillator 11. If, for example, this oscillator is adjusted to 2 mc./s., an interpolation frequency of 4 mc./s. occurring at the mixer stage 10 together with double the interpolation oscillator frequency generated in this mixer stage may produce a control voltage. Similar to what has been described hereinbefore the narrow-band interpolation frequency filter 9 prevents the occurrence of such a spurious synchronization.

In addition, a spurious synchronization may also occur if the coarse-step signal comprises additional frequencies which exceed the coarse-step frequency of, for example, 104 mc./s. aimed at and which differ from the latter frequency by approximately twice a possible interpolation frequency (of for example 3 mc./s.). This may occur if the 104 mc./s. signal is obtained from a signal of $6\frac{14}{15}$ mc./s. by frequency multiplication. In this event mixing of an additional frequency of $110\frac{14}{15}$ mc./s. with an auxiliary oscillator signal of $107\frac{14}{15}$ mc./s. produces a difference frequency of 3 mc./s. which together with the 3 mc./s. signal from the interpolation oscillator 11 gives rise to a control voltage and consequently causes the auxiliary oscillator to be stabilized on $107\frac{14}{15}$ mc./s. instead of on 107 mc./s., as required. In view of spurious synchronizations of this kind it is advisable that the minimum frequency produced in the coarse-step generator 6 should be at least 10 mc./s., preferably at least 39 mc./s., which is enabled by the use of overtone crystals.

Hereinbefore various ways have been mentioned in which spurious synchronizations, additional frequencies in the auxiliary oscillator signal, and interference whistles, may occur. It should be mentioned expressly that the various ways in which these disturbances may occur have not been dealt with exhaustively. After the enumeration of ways in which undesirable frequencies may be produced it may suffice to mention that it has proved advantageous, with output frequencies occurring in the coarse step generator signal which are less than approximately five times the highest interpolation frequency and may, for example, be 10 mc./s., for the interpolation frequency band to be such that it does not comprise one half or one third of this output frequency, i. e. in the case concerned 2–3 mc./s. or 3.5–4.5 mc./s. In addition, in choosing the interpolation frequency band allowance must be made for the fact that an interpolation frequency of less than approximately 1.5 mc./s. in practice gives rise to difficulty with respect to the stability requirement which the auxiliary oscillator 3 must satisfy and that interpolation frequencies of, for example, 4.5 mc./s. and more unduly increase the stability requirements which the interpolation oscillator 11 must satisfy.

The block diagram of the main AFC loop will now be described. This loop is similar to the auxiliary AFC loop 2 which has been described in detail. What has been mentioned with respect to the auxiliary AFC loop relatively to the occurrence of interference whistles, interfering additional frequencies and spurious synchronizations mutatis mutandis also applies to the main AFC loop.

The main AFC loop 1 in Figure 1 comprises a main oscillator 16 which is adjustable between 120 and 170 mc./s. The signal of the main oscillator is the output signal of the multi-channel generator shown in Figure 1 and can be taken from output terminal 17.

The main oscillator 16 is stabilized on the desired frequency as follows. The main oscillator signal is supplied via a separating amplifier 18 to an input of a mixer stage 19 to which through a lead 20 the output signal of the auxiliary oscillator 3 is also supplied. The intermediate frequencies produced in the mixer stage 19 in the embodiment shown are chosen between 14 and 23 mc./s. and are taken from the mixer stage 19 through an intermediate frequency filter 21. The intermediate frequency filter is adapted to be tuned in 10 steps each of 1 mc./s. to integral multiples of 1 mc./s., in the case concerned to 14, 15 . . . 22 and 23 mc./s. The resulting intermediate frequency is supplied to a second mixer stage 22 to one input of which a fine-step generator 23 is connected. The fine-step generator 23 is crystal controlled and comprises ten crystals 24 which can be switched on at will by means of a fine-step switch 25. According to the selected crystal the fine-step generator produces a frequency of 14, 15 . . . 22 or 23 mc./s. The fine-step generator frequency together with an intermediate frequency of equal value which is derived from the intermediate frequency filter 21 provides a control voltage which through a control tube 26 and a smoothing filter 27 in the form of a low-pass filter is supplied to a frequency corrector 28, which is coupled to the frequency determining circuit of the main oscillator 16.

The main AFC loop is required to stabilize the frequency of the main oscillator 16 on a value which exceeds the frequency of the auxiliary oscillator 3 signal supplied through the lead 20 to the first mixer stage 19 by an amount determined by the fine-step generator. If, for example, due to the adjustment of the coarse-step generator 6 to 104 mc./s. and of the interpolation oscillator to 2.7 mc./s. the auxiliary oscillator 3 produces a frequency of 106.7 mc./s., the fine-step generator 23 being adjusted to 16 mc./s., the main oscillator 16 is stabilized on 122.7 mc./s. Prior to this stabilization being effected through the main AFC loop 1 the main oscillator 16 must be adjusted to approximately the desired frequency, for example with a degree of accuracy of approximately 0.3 mc./s. However, if the main oscillator frequency differs from the desired frequency of 122.7 mc./s. by 0.3 mc./s., for example is adjusted at 122.4 mc./s., no automatic stabilization occurs, if the smoothing filter 27 exhibits a cut-off frequency of from 10 to 25 kc./s. in a manner similar to the smoothing filter 13 provided in the auxiliary AFC loop 2. In order to insure automatic catching in the main AFC loop 1 under these conditions the control tube 26 has an auxiliary tube 29 coupled to it which in the absence of stabilization together with the control tube 26 constitutes a search voltage oscillator for the production of a very low frequency search voltage of approximately 5 to 30 mc./s. This search voltage is set up in the control lead and through the frequency corrector 28 provides a slow frequency modulation of, for example $\pm 0.5$ mc./s. of the main oscillator 16 until the synchronization point, i. e. 122.7 mc./s., is passed. As soon as the synchronization point is passed the search voltage generator 26, 29 stops oscillating due to the occurring stabilization of the main oscillator frequency in the main AFC loop 1. The detailed design of such a search voltage generator 26, 29 and its operation will be described hereinafter with reference to a detailed embodiment of a circuit arrangement in accordance with the invention. Here it is only mentioned expressly that in the absence of stabilization a search voltage is produced and that this search voltage is not produced when catching and resultant stabilization of the main oscillator occur.

In the described main AFC loop 1 the intermediate frequency filter 21 may be in the form of a fixed tuned band-pass filter having a pass range of from 14 to 23 mc./s., provided the selection of the desired intermediate frequencies is determined unmistakably by the signal of the fine-step generator 23 and the said pass range. This is, for example, the case if the crystals 24 are overtone crystals which directly produce the desired frequency. However, if the frequencies indicated in the drawing at the crystals are obtained by frequency multiplication, for example by tripling a lower crystal frequency, the signal of the fine-step generator 23 will include not only the desired frequency but also undesirable harmonic frequencies of the output frequency. In this event the intermediate frequency filter 21 is made so as to be adapted to be tuned since the use of a fixed tuned band-pass filter may give rise to spurious synchronization of the main oscillator 16 and the occurrence in its output signal of undesirable additional frequencies. As is shown in Fig. 1 by broken lines, the tuning means of the intermediate frequency filter 21 may be coupled to the fine-step selector switch 25.

Hereinbefore the manner has been described in which the main oscillator 16 is stabilized on a frequency of 122.7 mc./s. with an auxiliary oscillator frequency of 106.7 mc./s. and a fine-step frequency of 16 mc./s. If the auxiliary oscillator frequency remains unchanged at 106.7 mc./s. but the fine-step generator produces a frequency of 17 mc./s., the main oscillator 16 after suitable initial adjustment is stabilized on 123.7 mc./s. According to the selection of the fine-step frequency by means of the switch 25 the main oscillator 16 can be stabilized to ten frequencies spaced by intervals of 1 mc./s., with a given frequency of the auxiliary oscillator 3. Thus, the fine step of 1 mc./s. is selected by means of the fine-step generator 23 and the selector fine-step switch 25. When describing hereinbefore the auxiliary AFC loop 2 it has already been mentioned that the desired coarse-step of 10 mc./s. is chosen by means of the coarse-step generator 6 and the selector switch 7 and that the interpolation oscillator 11 covers a band of 1 mc./s. The means indicated consequently enable the main oscillator 16 to be stabilized on any frequency between 120 and 170 mc./s. in coarse steps of 10 mc./s., fine-steps of 1 mc./s. and by adjustment of the interpolation oscillator within a band of 1 mc./s., which adjustment may, if required, be effected in interpolation steps. Summing up, the described system comprising a main AFC loop 1 and an auxiliary AFC looop 2 constitutes a three decade multi-channel generator in which the first and third decade are selected in the auxiliary AFC loop 2 and the second decade is selected in the main AFC loop 1. This division of the selection of the decades over two AFC loops provides the important advantage that in both loop systems the input and output frequencies of the first mixer stages, 5 and 19, differ from one another by about at least an order of magnitude and in addition difficulties which might otherwise arise, such as interference whistles, undesirable additional frequencies and spurious synchronizations, are avoided even if the filters provided in the AFC loops (9, 13, 21, 27) are of simple design.

A further advantage of the described multi-channel generator consists in that any undesirable additional frequencies which may occur in the output signal of the auxiliary oscillator 3 which differ from the desired frequency by more than the cut-off frequency of the control voltage filter in the main AFC loop 1 are attenuated by the control voltage filter 27 and, as the case may be, by the intermediate frequency filter 21. Experiments have shown that in arrangements of the kind shown in Fig. 1 such additional frequencies in the output signal of the main oscillator 16 may be substantially suppressed, i. e. to a level of —80 to —90 db as compared with the desired output signal. In contra-distinction to known multi-channel generators which are adjustable by a three decade method the described multi-channel generator exhibits no frequency channels in the V. H. F. range of from 100 to 200 mc./s. which cannot be used or can be used only restrictedly.

Since in practice an attenuation of additional frequencies to —60 db usually suffices, the apparatus may be simplified, there may be savings in tubes and in crystals as compared with the arrangement shown in Fig. 1, as will be described more fully hereinafter, without the occurrence of additional frequencies which interfere in practice or of interference whistles and without reduction in the usability of any frequency channel.

Fig. 2 is a block diagram of a multi-channel generator in accordance with the invention which covers the entire V. H. F. range of from 100 to 200 mc./s., in which the desired frequency is again selected in three decades and in which in order to save crystals the fine-step generator is not provided with 10 crystals, as is the case with the arrangement shown in Fig. 1, but comprises only a single crystal.

The multi-channel generator shown in Fig. 2 comprises an auxiliary AFC loop 30 and a main AFC loop 31.

The auxiliary AFC loop 30 comprises similarly to that shown in Fig. 1 an auxiliary oscillator 32 which is adapted to be tuned stepwise to the center frequencies of ten 1 mc./s. bands which are spaced by intervals of 10 mc./s. The mc./s. bands are from 87 to 88 mc./s., 97 to 98 mc./s. . . . 167 to 168 mc./s. and 177 to 178 mc./s. In the auxiliary AFC loop 30 the signal from the auxiliary oscillator 32 is supplied to a mixer stage 33 which is connected to a coarse-step generator 34 comprising overtone crystals 36 which can be selected by a coarse-step switch 35. The coarse-step generator 34 according to the selected overtone crystal produces a frequency which is an integral multiple of 10 mc./s. and in the case concerned is 90 mc./s., 100 mc./s. . . . 170 mc./s. or 180 mc./s.

To the output of the mixer stage 33 a fixed tuned interpolation frequency filter 37 having a pass range of from 2 to 3 mc./s. is connected. Through this filter 37 the interpolation frequency derived from the mixer stage 33 is supplied to a second mixer stage 38 of the auxiliary AFC loop 30. Similarly to what has been described with reference to Fig. 1, the mixer stage 38 is also connected to an interpolation oscillator 39, which is adjustable from 2 to 3 mc./s. continuously or stepwise. If the signals supplied to the mixer stage 38 are of equal frequency this stage produces a control direct current which through a control tube 40 and a smoothing filter 41 so controls a frequency corrector 42 which is coupled to the frequency determining circuit of the auxiliary oscillator 32 that the auxiliary oscillator frequency becomes exactly equal to the difference of the frequency supplied by the coarse-step generator 34 and the frequency of the interpolation oscillator 39.

The smoothing filter 41 for the control current again preferably has a cut-off frequency of from 10 to 25 kc./s. with the result that generally after selection of the coarse-step generator frequency and adjustment of the interpolation frequency no automatic catching will occur due to an insufficiently accurate initial adjustment of the auxiliary oscillator 32. In order to insure catching the auxiliary AFC loop is provided with a test voltage generator consisting of the control tube 40 and an auxiliary tube 43 similarly to Fig. 1 (test voltage generator 26, 29). If the auxiliary oscillator is not stabilized on the desired frequency, the test voltage generator 40, 43 insures the production of a test voltage which via the frequency corrector 42 produces a frequency modulation of, for example, approximately ±0.8 mc./s. of the auxiliary oscillator 32, until the synchronization point is passed. As soon as the synchronization point is reached, the test voltage generator 40, 43 stops oscillating and a permanent stabilization of the auxiliary oscillator 32 on the frequency determined by the coarse-step generator 34 and the interpolation oscillator 39 is produced. Similarly to what has been described in detail with reference to Fig. 1 in the auxiliary AFC loop 30 the auxiliary oscillator 32 is adapted to be stabilized on any frequency of ten 1 mc./s. bands which are spaced by intervals of 10 mc./s. The center frequencies of these 1 mc./s. bands are indicated in the drawing at the auxiliary oscillator 32. Consequently, in Fig. 2 the selection of the first and third decade is effected in the auxiliary AFC loop similarly to Fig. 1.

The selection of the second decade is effected in the main AFC loop 31. This loop comprises a main oscillator 44 which is adjustable from 100 to 200 mc./s. Through a separating amplifier 45 adapted to be tuned together with the main oscillator the main oscillator signal is supplied to a mixer stage 46 to which the signal from the auxiliary oscillator 32 is also supplied through a lead 47. The difference frequency of the signals supplied to the mixer stage 46 lies within the band of from 13 to 22 mc./s. and must be an integral multiple of the fine step which is 1 mc./s. In order to insure that the desired difference frequency, which hereinafter will be referred to as intermediate frequency, is filtered out, the output of the mixer stage 46 is connected to an intermediate frequency filter 48 which is adapted to be tuned in steps of 1 mc./s. each to 13 mc./s., 14 mc./s. . . . 21 mc./s. and 22 mc./s. The output signal of the tunable intermediate frequency filter 48 is supplied to a separate mixer stage 49 which is connected to a fine-step generator 50 comprising a 1 mc./s. crystal 51. The fine-step generator 50 produces a sinusoidal signal at a frequency of 1 mc./s. This signal is converted in the mixer stage 49, which is a so-called pulse mixer tube and will be described more fully hereinafter, into sharp anode current pulses comprising higher harmonic frequencies of 1 mc./s. to at least 22 mc./s. In the pulse mixer tube 49 the 1 mc./s. pulses are amplitude modulated by the output signal of the tunable intermediate frequency filter 48. This mixing of the pulses and the intermediate frequency signal produces a direct voltage component which can be used as a control voltage, as soon as the frequency of the intermediate frequency signal is equal to a frequency component occurring in the frequency spectrum of the 1 mc./s. pulses. This will consequently be the case, if the intermediate frequency signal has a frequency which is an integral multiple of 1 mc./s., for example 19 mc./s. If in the output of the first mixer stage 46 an intermediate frequency of 19 mc./s. occurs, in the output of the pulse mixer tube 49 a control voltage which is effective in practice will only be produced if the intermediate frequency filter 48 is tuned to 19 mc./s. If it is tuned to another intermediate frequency than 19 mc./s., the 19 mc./s. output signal of the mixer stage 46 is attenuated in the intermediate frequency filter in to such a degree that no effective control voltage is produced in the output of the pulse mixer tube 49. Consequently, in the manner described the tuning of the intermediate frequency filter 48 to any one of the 10 available tuning frequencies determines which intermediate frequency will supply a control voltage adapted to provide stabilization. Thus the fine-step selection is effected by tuning the intermediate frequency filter 48 instead of by the selection of one of ten fine step crystals 24, as is the case in the main AFC loop 1 of the arrangement shown in Figure 1.

Similarly to the arrangement shown in Figure 1, in the main AFC loop 31 of the arrangement shown in Figure 2 the output voltage of the second mixer stage (49) through a control tube 52 and a smoothing filter 53 controls the frequency corrector 54 of the main oscillator 44. The control tube 52 has an auxiliary tube 55 coupled to it which together with the control tube 52 produces a search voltage which only occurs in the absence of stabilization of the main oscillator 44 and acts to vary the tuning frequency of this main oscillator 44 by approximately $\pm 0.5$ mc./s.

Stabilization of the main oscillator 44 is produced as soon as its frequency exactly corresponds to the sum of the frequency of the auxiliary oscillator 32 and the higher harmonic frequency of 1 mc./s. selected by tuning the intermediate frequency filter 48. The output signal of the multi-channel generator shown in Fig. 2 can be taken from an output terminal 56 connected to the main oscillator 44.

In the multi-channel generator shown in Fig. 2 care must be taken to insure that the pulses occurring in the pulse mixer tube 49, more particularly the fundamental frequency thereof, do not penetrate to the frequency corrector 54, since this would result in an undesirable phase modulation of the main oscillator signal by 1 mc./s. and higher harmonics thereof. Consequently, particular attention must be paid to the smoothing process in the control lead of the main AFC loop 31. The smoothing filter 53 may, for example, comprise a $\pi$-section having a cut-off frequency of approximately 0.5 mc./s. and a rejector circuit tuned to 1 mc./s. in order to insure that these undesirable additional frequencies in the output signal of the main oscillator 44 are weaker than the output signal by approximately 70 to 80 db.

However, the improved design of the smoothing filter 53 has the advantage that no separating amplifier need be used in the auxiliary AFC loop 30 between the auxiliary oscillator 32 and the mixer stage 33 coupled to this oscillator. In the output signal of the auxiliary oscillator 32 the frequency supplied from the coarse-step generator 34 will appear as an additional frequency which only differs from the frequency of the auxiliary oscillator signal by 2 to 3 mc./s. and, for example, is only 40 db weaker than the desired output signal. This additional frequency, however, is substantially rejected in the main AFC loop by the smoothing filter 53, the selectivity of the tunable intermediate frequency filter 48 also contributing towards the desired attenuation. Thus, in the arrangement shown in Fig. 2 the saving in crystals as compared with the arrangement shown in Fig. 1 can be effected in practice without difficulty.

A preferred detailed design of the auxiliary AFC loop 30 and the main AFC loop 31 of Fig. 2 will now be described with reference to Figs. 3A and 3B respectively. In these Figures 3A and 3B parts corresponding to Figure 2 and shown in detail are surrounded by broken lines and designated by like reference numerals.

The auxiliary oscillator 32 comprises a triode 57 having a tunable oscillator circuit 58 connected between the anode and the control grid, which circuit is adapted to be tuned in steps of 10 mc./s. each, for example, with the aid of a click-stop mechanism (not shown). A center tap on the coil of the oscillator 58 is connected through a series resistor 59 to a 150 volt anode voltage lead 60.

The mixer stage 33 of the auxiliary AFC loop 30 comprises a pentode 61 used as a mixer tube. The cathode lead of this pentode includes a cathode resistor 62 which is bridged by a coupling capacitor 63 and a resistor 64 which is large compared with the cathode resistor 62. To the junction of the coupling capacitor 63 and the resistor 64 a signal is supplied from a triode oscillator 32, which signal is taken from a cathode resistor 65 of an oscillator triode 57.

The signal supplied from a coarse-step generator 34 is supplied to the control grid of a mixer pentode 61 through a coupling capacitor 66. The anode circuit of the mixer pentode 61 comprises a damped circuit 67 which is tuned to the interpolation frequency and the end of which remote from the anode is connected to a 250 volt anode voltage lead 68 through a decoupling network comprising a resistor 69 and a shunt capacitor 70.

The interpolation frequency derived from the mixer pentode 61 is supplied through a coupling capacitor 71 to a second mixer stage 38 of the auxiliary AFC loop. The input circuit thereof consists of a damped circuit 72 which is tuned to the interpolation frequency and one end of which is connected to earth. In order to filter out the desired interpolation frequency band of from 2 to 3 mc./s. the circuits 67 and 72 may be tuned to 2.7 mc./s. and 2.3 mc./s. respectively. The use of even such a simple interpolation frequency filter insured that frequencies which differ from the interpolation frequency band of from 2 to 3 mc./s. by at least 0.5 mc./s. are attenuated by at least 12 to 15 db, which is sufficient in the present case.

The circuit coil of the circuit 72 has a secondary coil 73 coupled to it the ends of which through detectors 76, 77 which are bridged by resistors 74, 75 are connected to an output capacitor 78. A center tap on the secondary coil 73 is connected through a coupling capacitor 79 to the stable interpolation oscillator 39 which is adapted to be tuned from 2 to 3 mc./s. The mixer stage 38 described hereinbefore is in the form of a push-pull mixer stage and, if the frequencies of the interpolation frequency supplied to the circuit 72 and the frequency of the interpolation oscillator 39 are equal, supplies a direct voltage to the output capacitor 78 which voltage is dependent on the phase relation of the alternating voltages supplied to it. Thus, the mixer stage 38 acts as a phase detector.

The output voltage of this phase detector through a lead 80 is supplied to the control grid of a triode 81 which acts as the control tube 52. Through the smoothing filter 41 the anode current of this triode controls the frequency corrector 42. For this purpose the anode of the triode 81 is connected to the anode voltage lead 68 through the filter 41 and the frequency corrector 42.

The smoothing filter 41 includes an RC section comprising a series resistor 82 and a parallel capacitor 83 and also a series-connected parallel circuit comprising a coil 84 and a capacitor 85. The output end of this filter is provided with a terminal resistor 86 which is connected to earth through a direct voltage blocking capacitor 87. The filter 41 is proportioned such that its cut-off frequency is approximately 15 kc./s. and an additional damping is produced for the interpolation frequency band of from 2 to 3 mc./s.

The output lead 88 of the filter 41 is connected to a frequency corrector 42 through a series resistor 89. This frequency corrector comprises two capacitors 90, 91 which on the one hand are connected to an end of the oscillator circuit 58 and on the other hand are interconnected through a grid arrangement 92, 93, 94, 95. This grid arrangement acts to decouple the oscillator circuit and the control current circuit and comprises two diodes 92 and 93 and two interconnected coils 94 and 95 which are connected to the anodes of said diode. The junction of the coils 94 and 95 is connected to the anode voltage lead 68, the junction of the diodes 92 and 93 being connected to the anode of the control triode 81 through the series resistor 89, the lead 88 and the filter 41.

The anode current of the control triode 81 acts as the control current for the frequency corrector 42. A variation of this control current produces a proportional variation of the alternating current resistance of the diodes 92 and 93 and consequently a variation of the effective parallel capacitance of the oscillator circuit 58, which capacitance consists of the capacitors 90 and 91.

If the frequency of the oscillator 32 is stabilized on the control frequencies of the coarse-step generator 33 and the interpolation oscillator 39, the control direct voltage appearing in the output of the mixer stage 38 in the lead 80 controls the effective capacitance of the frequency corrector 42 through the control triode 81.

If, in the absence of stabilization of the oscillator 32, on the desired frequency, the frequency of the oscillator 32 differs by too large a value from the desired frequency for the synchronization point to be attained, a search voltage generator automatically becomes operative which consists of the control triode 52 and an auxiliary tube 43. This auxiliary tube is constituted by a triode 96 which together with the triode 81 forms a double-triode tube having a cathode resistor 97. The anode of the triode 81 through a RC network which determines the search voltage frequency is coupled back to the control grid of the triode 96. This RC network comprises the series combination of a resistor 97, a capacitor 98 and a resistor 99 connected in parallel with a capacitor 100.

Thus, the control triode 81, the auxiliary triode 96 and the RC network 97—100 together constitute a Wien-bridge generator acting as a search voltage generator. The RC-network preferably is proportioned such that the search voltage generator produces a frequency of, for example, from 3 to 25 C./S.

The search voltage generator oscillates only, if the H. F. oscillator 32 is not locked to the control frequencies of the coarse-step generator 34 and the interpolation oscillator 39. When locked the AFC circuit produces a stabilization of the anode current of the control triode 81, which prevents the search voltage generator from oscillating. In the absence of locking the search voltage produces a variation of the tuning of the oscillator circuit 58 over a frequency range of, for example, 0.8 mc./s. on either side of the instantaneous oscillator frequency until the synchronization point is passed and consequently catching and stabilization of the frequency of the auxiliary oscillator 32 is produced.

Fig. 3B shows a preferred detailed design of the main AFC loop 31 shown in Fig. 2, in which, as has been mentioned hereinbefore, parts which are shown in detail in Fig. 3B and correspond to Fig. 2 are surrounded by broken lines and are designated by like reference numerals.

The main AFC loop shown in Fig. 3B comprises a main oscillator 44 comprising a triode 101 and a tunable oscillator circuit 102 connected in the anode circuit of said triode. This triode oscillator is of the same kind as the triode oscillator 32 shown in Fig. 3A.

The oscillator signal taken from a cathode resistor 103 of the triode 102 is supplied through a coupling capacitor 104 to the control grid of a pentode 105 which acts as the separating amplifier 45. The anode lead of the pentode 105 comprises an anode circuit 106 which is adapted to be tuned together with the oscillator circuit 102 and comprises a circuit coil having a center tap which through a de-coupling network 107 is connected to a 150 volt anode voltage lead 108.

The signal derived from the anode circuit 106 of the separating amplifier 45 is supplied through a lead 109 to the first mixer stage 46 of this AFC loop. The mixer stage 46 comprises a mixer triode 110 having a cathode resistor 111. The signal from the separating amplifier 45 is supplied to the triode control grid through the lead 109. Signals from the auxiliary AFC loop (cf. Fig. 3A) are supplied to the cathode of the mixer triode through the lead 47 and a coupling capacitor 112. The anode of the mixer triode 110 is connected to a 250 volt anode voltage lead 115 through a tunable intermediate frequency circuit 113 and a de-coupling network 114. The tunable intermediate frequency circuit 113 forms part of the intermediate frequency filter which is shown in Fig. 2 at 48 and is adapted to be tuned between 13 and 22 mc./s. in steps of 1 mc./s. each.

The intermediate frequency signal derived from the anode of the mixer triode 110 is supplied through a lead 116 to, a tunable intermediate frequency amplifier 48 comprising a pentode 117. The anode of the pentode 117 for this purpose is connected to the anode voltage lead 108 through a second tunable intermediate frequency circuit 118 and a de-coupling network 119. The intermediate frequency circuits 113 and 118 together are adapted to be tuned to the desired intermediate frequencies for the fine-step selection described in detail with reference to the main AFC loop 31 shown in Fig. 2.

The resulting intermediate frequency signal through a lead 120 is supplied to the separate mixer stage 49 comprising a pulse mixer tube 121.

The pulse mixer tube 121 comprises a cathode system for the production of an electron beam, which system is shown only diagrammatically, and deflector plates 122 for deflecting the electron beam. On either side of the deflector plates 122 screen grids are arranged, which are connected to the anode voltage lead 115 through a de-coupling network 123. In addition, the pulse mixer tube 121 comprises a strip-shaped collector anode 124 which is struck by the oscillating electron beam intermittently for short period of time with the result that at this collector anode sharp pulses occur in accordance with an applied deflection voltage.

The pulse mixer tube also comprises an electrode 125 which, due to a suitable bias voltage with respect to the cathode, normally suppresses the electron beam and only releases this beam at a gate voltage supplied to it via a lead 126.

Finally the pulse mixer tube comprises an intensity control grid 127 connected to the lead 120.

Before the operation of the pulse mixer tube 121 will be described more fully, the detailed design of the fine-step generator 50 will first be described. This fine step generator consists of a crystal oscillator of a kind known per se comprising a pentode 128 and a frequency-determining 1 mc./s. crystal 51 which is connected between the screen grid and the control grid of the pentode 128.

The anode circuit of the pentode 128, which pentode produces a sinusoidal voltage at a frequency of 1 mc./s., comprises a band-pass filter which is tuned to the oscillator frequency and comprises a primary circuit 129 and a secondary circuit 130 which is inductively coupled to the primary circuit. As is well known, in such a band-pass filter the voltage across the primary circuit 129 is about 90° out of phase with the voltage across the secondary circuit 130. A center tap on the secondary circuit 130 is connected to earth through a de-coupling capacitor 131 for high frequency voltages and is also connected to an anode voltage divider 132. The ends of the secondary circuit 130 are connected through leads 133 to the deflector plates 122 of the pulse mixer tube 121. The voltage set up across the primary band pass filter circuit 142, which voltage is about 90° out of phase with the deflector voltage, is supplied to the gate electrode 125 of the pulse mixer tube 121 through a lead 126.

The pulse mixer tube 121 operates as follows. When an electron beam is produced the deflector plates due to the 1 mc./s. voltage supplied to them in push-pull cause the beam to swing periodically so that it strikes the collector anode 124 each time when the deflecting voltage passes through zero. As a result a sharp anode current pulse is produced twice per period of the 1 mc./s. deflecting voltage. The gate electrode normally cuts off the electron beam and only when a positive gate voltage occurs the electron beam is released. The gate electrode 125 through the lead 126 has a voltage supplied to it which is 90 degrees out of phase with the deflecting voltages, so that only during one of the two passages through zero per period of the 1 mc./s. deflecting voltage an anode current pulse will be produced. However, the amplitude of the said anode current pulses is dependent on the intermediate frequency voltage supplied to the intensity control grid 127 through the lead 120. Thus, the intermediate frequency voltage is mixed with the 1 mc./s. pulses produced in the pulse mixer tube 121. The output voltage of the pulse mixer tube which is set up across the collector anode 124 comprises a direct voltage component, if the intermediate frequency and a higher harmonic of the 1 mc./s. pulses are equal, which component is set up across a smoothing capacitor 134 connected to the collector anode 124. The direct voltage thus obtained across the capacitor 134 constitutes the control voltage used for frequency stabilization of the main oscillator 44. For a more detailed description of pulse mixer tubes of the kind described and the operation thereof see U. S. Patent No. 2,736,803, issued February 28, 1956.

The control voltage thus obtained through a lead 135, the control tube 52 and the smoothing filter 53 controls the frequency corrector 54 of the main oscillator 44. The control tube 52 has an auxiliary tube 55 coupled to it which together with the control tube 52 constitutes a test voltage generator which is only operative in the absence of stabilization of the main oscillator 44. The control tube and the auxiliary tube are designed as a triode 136 and a triode 137, respectively, having a common cathode resistor 138.

The detailed design of the control tube 52, the auxiliary tube 55, the smoothing filter 53 and the frequency corrector 54 is essentially the same as that of the corresponding parts of the control lead circuit shown in Fig. 3A which have been described in detail hereinbefore, and consequently only the points of difference with respect to the design described above will be described more fully.

The control voltage lead 135 is at the anode potential of the collector anode 124 and consequently the common resistor of the triodes 136 and 137 must have a considerable direct voltage applied to it in order to obtain a suitable operating point for the triode 136. For this purpose the control grid of the triode 137 has a positive bias voltage applied to it which is derived from a voltage divider 139 connected between the anode lead 115 and earth.

The smoothing filter 53 comprises an additional filter section comprising resistors 140 and capacitors 141 and 142 in order to prevent instabilities in the AFC loop.

In the embodiment shown in Fig. 3B a particular smoothing of the control voltage and the control current, in order to reject frequencies of 1 mc./s. and higher harmonics thereof which they may comprise, is obtained by a proper choice of the time constant of the smoothing network comprising the output capacitor 134 and the anode resistor of the pulse mixer tube 121. Preferably this time constant is such that the cut-off frequency is approximately 100 kc./s. In addition, the parallel circuit 143, which is series-connected in the smoothing filter 53, is tuned to a frequency of 1 mc./s.

The output signal of the AFC loop shown in Fig. 3B is taken from the oscillator circuit 102 of the main oscillator 44 through a coupling coil 144 and a line 56.

In the detailed embodiments of the auxiliary AFC loop and the main AFC loop shown in Figs. 3A and 3B, respectively, there is no likelihood of the occurrence of additional frequencies which will interfere in practice and of interference whistles, even if use is made of so-called double tubes, more particularly triode-pentode tubes of the kind shown in the figures, which may be of particular importance in practice.

Fig. 4 shows a further embodiment of a multi-channel generator in accordance with the invention, in which the coarse step generator, the fine step generator and the interpolation oscillator are all controlled by a single crystal.

This multi-channel generator again comprises an auxiliary AFC loop 145 and a main AFC loop 146.

The auxiliary AFC loop 145 comprises an auxiliary oscillator 147 and a frequency corrector 148 coupled thereto. Similarly to the embodiments of the multi-channel generator described hereinbefore the auxiliary oscillator is adapted to be tuned, for example by means of a stepping mechanism, to ten 1 mc./s. bands which are spaced from each other by intervals of 10 mc./s. The center frequencies of these bands are indicated at the auxiliary oscillator.

In the auxiliary AFC loop 145 the auxiliary oscillator signal is supplied to a mixer stage 149 comprising a pulse mixer tube of the kind described in detail with reference to Fig. 3B (121 in Fig. 3B). The pulse mixer tube 149 has a 10 mc./s. control voltage supplied to it, which voltage determines the magnitude of a frequency coarse step and is supplied from a multiplier stage 151 which through a further multiplier stage 152 is connected to a 1 mc./s. crystal oscillator 153.

If the auxiliary oscillator 147 is adjusted to the center frequency of any of the available 1 mc./s. bands, for example to 97.5 mc./s., the auxiliary oscillator frequency when mixed with the 10th harmonic of 10 mc./s. pulses set up in the pulse mixer tube 149 produces a difference frequency of 2.5 mc./s. which is supplied to a tunable interpolation frequency amplifier 154. This interpolation frequency amplifier is adapted to be tuned in steps of 0.1 mc./s. each from 2 to 3 mc./s. and serves similarly to the tunable intermediate frequency amplifier 48 shown in Fig. 2 to select any of ten interpolation steps within a 1 mc./s. band.

The output signal of the interpolation frequency amplifier 154 controls a second mixer stage 155 of the auxiliary AFC loop 145, which mixer stage 155 also comprises a pulse mixer tube. In this mixer tube pulses at a fundamental frequency of 0.1 mc./s. are set up in that a sinusoidal voltage of 0.1 mc./s. is supplied to the tube through a lead 156. This sinusoidal voltage is derived from an oscillator 157 which determines the interpolation steps and consists of an LC oscillator which is tuned to 0.1 mc./s. and in synchronism with a crystal oscillator 153 due to the fact that the control grid of the oscillator tube has a 1 mc./s. voltage from the crystal oscillator 153 supplied to it.

In the pulse mixer tube 155 pulses are produced at a fundamental frequency of 0.1 mc./s., which pulses when mixed with an interpolation frequency taken from a tunable amplifier 154 produce a control voltage in the output circuit of the pulse mixer tube as soon as the interpolation frequency is equal to a higher harmonic of the 0.1 mc./s. pulses.

A control tube 158 has an auxiliary tube 160 coupled to it which together with the control tube constitutes a search voltage generator which is operative in the absence of stabilization of the auxiliary oscillator 147. The output of the control tube 158 is fed to the frequency corrector 148 through a smoothing filter 159.

If the auxiliary oscillator is adjusted to any of the 1 mc./s. bands, for example to 167.5 mc./s., and the interpolation frequency amplifier is tuned to any of the interpolation frequencies, for example to 2.1 mc./s., the auxiliary oscillator will be stabilized on 167.9 mc./s., for after the auxiliary oscillator adjustment and the tuning frequency of the amplifier 154 have been selected, the search voltage generator initially produces a frequency modulation of the auxiliary oscillator with a sweep of for example $\pm 0.8$ mc./s. until the synchronisation point, i. e. 167.9 mc./s., is passed. At that instant mixing of the auxiliary oscillator signal with the 170 mc./s. component available in the spectrum of the 10 mc./s. coarse-step pulses a difference frequency of 2.1 mc./s., which is transmitted by the amplifier 154 which is tuned thereto to the pulse mixer tube 155. In this pulse mixer tube mixing of this interpolation frequency with the 21st harmonic of the 0.1 mc./s. interpolation pulses produces the control direct voltage required for stabilization of the auxiliary oscillator 147 on the desired frequency of 167.9 mc./s.

Consequently, in the described auxiliary AFC loop system 145 the selection of the first and third decades for the frequency adjustment is effected by tuning of the auxiliary oscillator 147 and the interpolation frequency amplifier 154, respectively, the coarse-step frequency and the interpolation frequency being derived from a single control crystal 153.

The block diagram of the main AFC loop 146 corresponds to the block diagram of the main AFC loop 31 shown in Fig. 2 and consequently it is deemed sufficient to sum up the elements and described only the points of difference more fully.

The main AFC loop 146 comprises in succession a main oscillator 161, a separating amplifier 162 adapted to be tuned together with this main oscillator, a first mixer stage 163, a tunable intermediate frequency amplifier 164, and a second mixer stage 165 comprising a pulse mixer tube a control tube 166 and an auxiliary tube 167 coupled to this control tube, a smoothing filter 168 and a frequency corrector 169 which is coupled to the frequency determining circuit of the main oscillator 161.

To the first mixer stage 163 of this AFC loop the output signal of the auxiliary oscillator 147 is supplied through a lead 170. To the pulse mixer tube 165 a 1 mc./s. voltage which detremines the frequency fine steps is supplied through a lead 171 which is connected to an output of the 1 mc./s. crystal oscillator 153.

The main AFC loop 146 produces frequencies which are adjustable between 70 and 170 mc./s. In view thereof of the intermediate frequency amplifier 164 is adapted to be tuned over a range of from 17 to 8 mc./s. in steps of 1 mc./s. each.

The output voltage of the main oscillator 161 can be taken from output terminal 172. Its frequency is adjustable in three decades within the selected frequency band of from 70 to 170 mc./s. in coarse steps of 10 mc./s. which can be selected by adjustment of the auxiliary oscillator 147, in fine steps of 1 mc./s. which can be selected by adjustment of the tuning frequency of the intermediate frequency amplifier 164 and in interpolation steps of 0.1 mc./s. by selection of the tuning frequency of interpolation frequency amplifier 154. Since all the stabilizing frequencies are crystal controlled, the output frequency of the main oscillator 161 also exhibits crystal stability. Since all the stabilizing frequencies are derived from a single crystal and this crystal consequently is the only crystal contained in the apparatus, special attention may, for example, be paid to the temperature stabilization of this crystal frequency, and the stability of the final frequency at the output terminal 172 can be made better than $10^{-7}/°$ C.

It will be obvious that a plurality of modifications of the described arrangement fall within the scope of the invention, only a few of which will be mentioned hereinafter.

In the embodiment which has been described in detail for the sake of simplicity mention has, for example been always made of a frequency corrector comprising diodes. Naturally a reactance tube circuit arrangement which is suited to the frequency ranges aimed at can also be used.

In addition, in most of the described AFC loops a separate search voltage generator consisting of a control tube and an auxiliary tube is used to obtain locking. Such a search circuit can be replaced in any of the AFC loops by a frequency discriminator of the kind designated 15 in Fig. 1, which bridge the second mixer stage and is adaped to be tuned. Such a tunable frequency discriminator may be suitably combined with the associated mixer stage; see U. S. Patent No. 2,624,006, issued December 30, 1952.

The interpolation frequencies can not only be stabilized on a crystal frequency in the manner shown in Fig. 4 with the use of a pulse mixer tube, but also in a different way. Use, may, for example, be made of an oscillator which is adapted to be tuned over a frequency band of from 2 to 3 mc./s., which oscillator is synchronized with the given interpolation frequencies by means of frequency division. For this purpose the 5 mc./s. frequency derived from the multiplier 152 shown in Fig. 4 can be modulated by a pulsatory 0.1 mc./s. voltage in order to obtain a spectrum which extends from 4 to 6 mc./s. and contains spectrum components spaced by intervals of 100 kc./s. If such a spectrum voltage is supplied to the control grid of the oscillator which is adapted to be tuned between 2 and 3 mc./s., this oscillator with initially approximately correct tuning to frequencies of 2.00 mc./s., 2.05 mc./s., 2.10 mc./s. . . . 2.90 mc./s., 2.95 mc./s. and 3.00 mc./s. will automatically be synchronized with the component of double this frequency contained in the spectrum. The last-mentioned modification can be of advantage in view of the requirements which the smoothing filter connected in the control lead of the auxiliary AFC loop 145 should satisfy.

What is claimed is:

1. A stabilized multi-channel generator adjustable in coarse, fine and interpolation frequency steps, comprising a main oscillator having a first frequency corrector coupled thereto, an automatic frequency control loop for stabilizing said main oscillator and comprising a first mixer, means connecting said main oscillator to an input of said first mixer, an auxiliary oscillator connected to an input of said first mixer and having a second frequency corrector coupled thereto, a second mixer, a first filter connected between the output of said first mixer and an input of said second mixer, a fine-step generator connected to an input of said second mixer, and a second filter connected between said frequency corrector and the output of said second mixer, and an auxiliary automatic frequency control loop for stabilizing said auxiliary oscillator and comprising a third mixer, means connecting said auxiliary oscillator to an input of said third mixer, a coarse-step oscillator connected to an input of said third mixer, a fourth mixer, a third filter connected between the output of said third mixer and an input of said fourth mixer, an interpolation oscillator connected to an input of said fourth mixer, and a fourth filter connected between said second frequency corrector and the output of said fourth mixer.

2. A generator as claimed in claim 1, comprising means for tuning said interpolation oscillator over a frequency band equal to said fine frequency steps.

3. A generator as claimed in claim 2, in which said third filter is a band-pass filter having a bandwidth substantially equal to said fine frequency steps.

4. A generator as claimed in claim 1, including means for tuning said auxiliary oscillator, comprising a frequency discriminator connected between the first-mentioned input of said fourth mixer and the output of said fourth mixer, means for tuning said frequency discriminator to a desired interpolation frequency, means for tuning said interpolation oscillator, and means for intercoupling the two last-named tuning means.

5. A generator as claimed in claim 1, including stepping means for tuning said auxiliary oscillator in frequency steps equal to said coarse frequency steps.

6. A generator as claimed in claim 1, in which said coarse-step generator comprises a crystal-controlled oscillator for producing a sinusoidal voltage at a frequency equal to said coarse frequency steps, and in which said third mixer comprises a cathode-ray tube having means for producing an electron beam, a beam-intensity control electrode connected to said auxiliary oscillator, beam-deflection means connected to said coarse-step generator, and an output anode upon which the deflected electron beam impinges periodically.

7. A generator as claimed in claim 1, in which said fine-step generator comprises a crystal-controlled oscillator for producing a sinusoidal voltage at a frequency equal to said fine frequency steps, and in which said second mixer comprises a cathode-ray tube having means for producing an electron beam, a beam-intensity control electrode connected to the output of said first filter, beam-deflection means connected to said fine-step generator, and an output electrode upon which the deflected electron beam impinges periodically.

8. A generator as claimed in claim 7, including means for tuning said first filter in fine steps to the output frequency of said first mixer.

9. A generator as claimed in claim 8, further including a test voltage oscillator connected in said main automatic frequency control loop at a point between said second mixer and said second filter, and tuning means actuated by said test voltage oscillator to tune said main oscillator into synchronization whenever said main oscillator becomes unsynchronized.

10. A generator as claimed in claim 1, in which said coarse-step oscillator and said fine-step generator comprise a single crystal oscillator and means to derive said coarse-step and fine-step frequencies therefrom.

References Cited in the file of this patent

UNITED STATES PATENTS

| | | |
|---|---|---|
| 2,487,857 | Davis | Nov. 15, 1949 |
| 2,558,100 | Rambo | June 26, 1951 |
| 2,595,608 | Robinson et al. | May 6, 1952 |
| 2,704,329 | Lau | Mar. 15, 1955 |

UNITED STATES PATENT OFFICE

CERTIFICATE OF CORRECTION

Patent No. 2,843,740 July 15, 1958

Marius Robert Mantz et al.

It is hereby certified that error appears in the above numbered patent requiring correction and that the said Letters Patent should read as corrected below.

In the heading to the printed specification, between lines 8 and 9, insert the following:

-- Claims priority, application Netherlands December 14, 1954 --

Signed and sealed this 7th day of October 1958.

(SEAL)

Attest:

KARL H. AXLINE

Attesting Officer

ROBERT C. WATSON

Commissioner of Patents